United States Patent [19]

Miyano

[11] Patent Number: 4,827,600
[45] Date of Patent: May 9, 1989

[54] AUTOMATIC TOOL CHANGING MECHANISM FOR A MACHINE TOOL

[75] Inventor: Toshiharu Miyano, Barrington Hills, Ill.

[73] Assignee: Miyano Machinery USA Inc., Wood Dale, Ill.

[21] Appl. No.: 180,388

[22] Filed: Apr. 12, 1988

[51] Int. Cl.$^4$ .............................................. B23Q 3/157
[52] U.S. Cl. ..................................... 29/568; 29/26 A; 408/35
[58] Field of Search ...................... 29/568, 26 A, 35.5, 29/40, 48.5 R; 408/35; 211/1.5

[56] References Cited

U.S. PATENT DOCUMENTS

| | | | |
|---|---|---|---|
| 3,604,083 | 9/1971 | Antonietto et al. | 29/26 A |
| 4,135,278 | 1/1979 | Kitamura | 29/26 A |
| 4,237,595 | 12/1980 | Kitamura | 408/35 X |
| 4,563,800 | 1/1986 | Bonga | 29/26 A |
| 4,614,020 | 9/1986 | Kanada | 29/568 |

FOREIGN PATENT DOCUMENTS

| | | | |
|---|---|---|---|
| 45839 | 3/1983 | Japan | 29/568 |
| 19648 | 2/1984 | Japan | 29/568 |
| 155338 | 8/1985 | Japan | 29/568 |
| 232845 | 11/1985 | Japan | 29/568 |
| 50735 | 3/1986 | Japan | 29/568 |
| 2186219 | 8/1987 | United Kingdom | 29/568 |

Primary Examiner—William Briggs
Attorney, Agent, or Firm—Ladas & Parry

[57] ABSTRACT

An automatic tool changer for a machine tool of the type having an upstanding spindle rotatably mounted to a spindlehead for joint vertical displacement therewith between a lower machining position and an upper retracted position via a tool change position therebetween. The tool changer includes an indexing tool magazine rotatable about a fixed slanting axis and carrying a set of cutting tools at prescribed angular spacings for successively bringing them to a position of axial alignment with the spindle. Also included are a chuck control cam for controlling the chucking and unchucking of the successive cutting tools to and from the spindle, and a gripper control cam for actuating a pair of gripper jaws releasably holding each cutting tool on the tool magazine. The tool magazine, chuck control cam and gripper control cam are all driven mechanically from a common drive motor for quick, reliable tool changing operation.

9 Claims, 9 Drawing Sheets

AUTOMATIC TOOL CHANGING MECHANISM FOR A MACHINE TOOL

BACKGROUND OF THE INVENTION

This invention relates to machine tools in general and, in particular, to those of the class having a set of different, interchangeable cutting tools mounted at pre-assigned angular spacings on an indexing tool magazine for selective use. Still more particularly, the invention pertains to an automatic tool changing mechanism in such a class of machines whereby the cutting tools on the tool magazine are successively mounted to, and dismounted from, a spindle moving toward and away from work for performing various operations thereon.

While a variety of automatic tool changers have been suggested and incorporated with machine tools, each such device generally resolves itself into three basic components: (1) an indexing tool magazine holding a set of cutting tools; (2) a tool transfer mechanism for the transfer of each cutting tool between the tool magazine and the spindle; and (3) a chuck for holding each cutting tool on the spindle. These three tool changer components must operate in well timed relation to one another for efficient machining of the work with the successive cutting tools. Heretofore, the components have been fluid actuated and/or cammed, or have been driven by servomechanisms. All such conventional actuating mechanisms are unsatisfactory by reason of complexity in the construction and arrangement of the required parts.

Japanese Patent Laid Open (KOKAI) No. SHO-60-155338 describes and claims a more simplified tool changer. It teaches tool transfer between the tool magazine and the spindle by cam and crank mechanisms actuated by the travel of the spindlehead toward and away from the work. However, for the indexing of the tool magazine, this prior art tool changer employs a fluid actuator devoted exclusively to that purpose. The fluid actuator requires a valve, which may be solenoid operated, for incrementally revolving the tool magazine. Each time the tool magazine is incremented, the operation of the solenoid valve must be checked to make sure that the magazine has been driven a unit distance. Such fluid operated indexing of the tool magazine is not so reliable in operation and quick in response as the cam operated tool transfer between the tool magazine and the spindle.

Another inconvenience with the noted prior art tool changer manifests itself during the continuous indexing of the tool magazine. Each cutting tool is held by a pair of gripping jaws on the tool magazine and is released therefrom by a finger acting directly on the gripping jaws. The release finger is held close to the gripping jaws during the continuous indexing of the tool magazine. Consequently, in the event of the malfunctioning of the electrical control means, the release finger may strike a tool on the magazine, possibly dropping the tool therefrom or destroying the magazine.

SUMMARY OF THE INVENTION

The present invention aims at the provision of a machine tool incoporating an automatic tool changing mechanism that is more positive and troubleproof in construction, more reliable in operation, and quicker in response than heretofore.

In summary, the invention provides a machine tool for use with a plurality of cutting tools, comprising a spindlehead mounted to frame means for linear reciprocation in a predefined direction, and a spindle mounted to the spindle for rotation about an axis extending in the predefined direction of movement of the spindlehead. The spindle travels with the spindlehead between a machining position and a retracted position past a tool change position. Mounted to the frame means for rotation about an axis at an angle to the spindle axis is an indexing tool magazine carrying a set of cutting tools at prescribed angular spacings. As the tool magazine is indexed, the successive cutting tools can be brought to a position of axial alignment with the spindle for engagement in a tool hole therein with the travel of the spindle from the retracted to the tool change position.

For automatically changing the cutting tool mounted to the spindle with those on the tool magazine, there are provided a chuck control cam and a gripper control cam which are both rotatably mounted to the frame means. The chuck control cam operates in conjunction with chuck control cam follower means for acting on chuck means built into the spindle, causing the chuck means to chuck and unchuck the successive cutting tools on the tool magazine in the tool change position. The gripper control cam coacts with gripper control cam follower means for acting on gripper means releasably gripping each cutting tool on the tool magazine, causign the gripper means to release each desired cutting tool that has been chucked onto the spindle in the tool change position, and to grip the used cutting tool that has been returned with the spindle from the machining position to the tool change position.

In order to drive the automatic tool changer, there is employed but one rotary actuator which is coupled to either one of the chuck control cam and the gripper control cam. A mechanical drive linkage transmits rotation from said one to the other of the chuck control cam and the gripper control cam. A mechanical intermittent drive means is also driven from the rotary actuator and coupled to the tool magazine for indexing the same in relation to the joint rotation of the chuck control cam and the gripper control cam.

In a preferred embodiment the rotary actuator is coupled to the chuck control cam for directly driving the same. The rotation of the chuck control cam is transmitted to the gripper control cam via a belt and sprocket arrangement employed as an example of the mechanical drive linkage. The rotation of the gripper control cam is transmitted in turn to the tool magazine via the intermittent drive means of conventional design capable of revolving the tool magazine a unit indexing angle upon 180 degrees rotation of the gripper control cam.

Thus, with not only the two cams but also the tool magazine driven from the common actuator, the improved tool changer of this invention fully attains the objects set forth previously.

The above and other features and advantages of this invention and the manner of realizing them will become more apparent, and the invention itself will best be understood, from a study of the following description and appended claims, with reference had to the attached drawings showing the preferred embodiment of the invention.

DESCRIPTION OF THE PREFERRED EMBODIMENT

General

Figure 1:
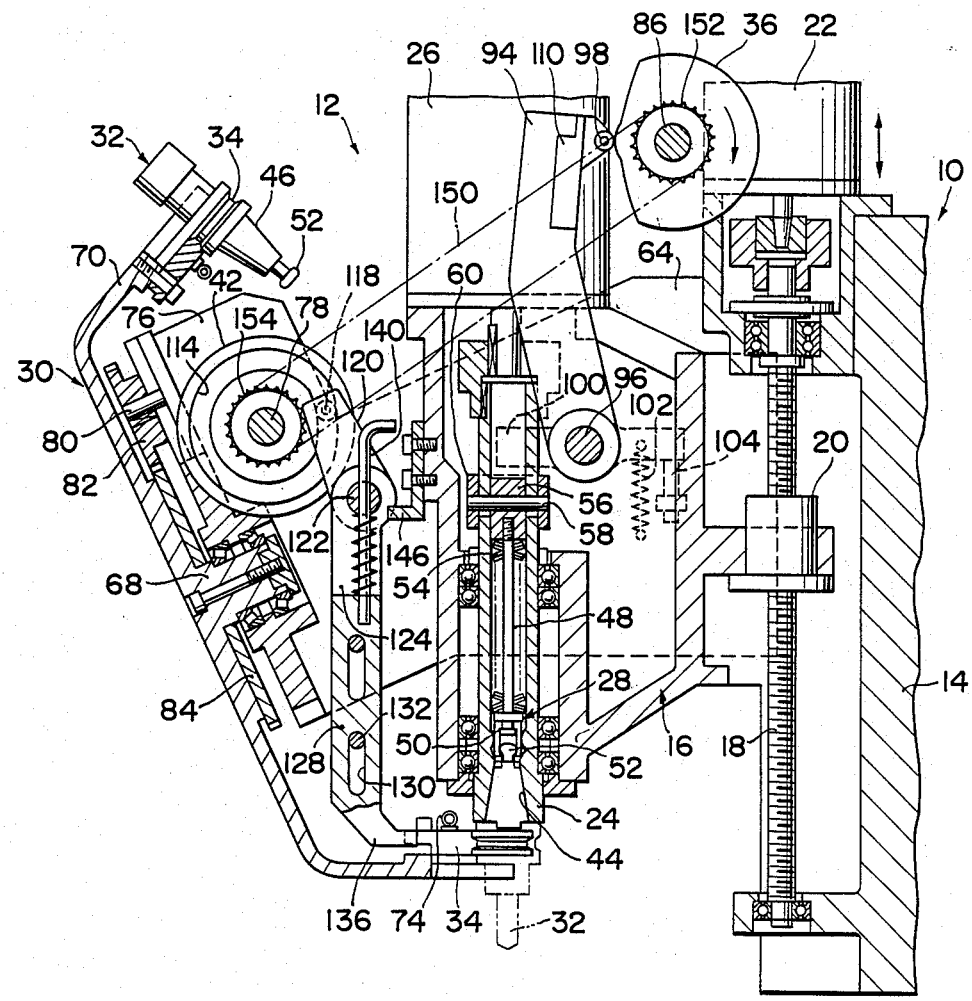
FIG. 1 is a partial vertical section through an example of machine tool incorporating the automatic tool changer constructed in accordance with the invention.

The invention will now be described more specifically in terms of the illustrated representative machine tool, generally designated 10 in FIGS. 1 and 2, including an automatic tool changer 12. The machine tool 10 has frame means including a column 14 to which a spindlehead 16 is mounted so as to be movable up and down relative to the column. For the up and down motion of the spindlehead 16 this embodiment conventionally employs an upstanding worm 18 and a ball nut assembly 20. The worm 18 is rotatably mounted to the column 14 and is coupled to an overlying bidirectional servomotor 22. Fitted over the worm 18, the ball nut assembly 20 is rigidly mounted to the spindlehead 16. Thus, with the bidirectional rotation of the worm 18 with the servomotor 22, the ball nut assembly 20 travels up and down with the spindlehead 16.

Figure 2:
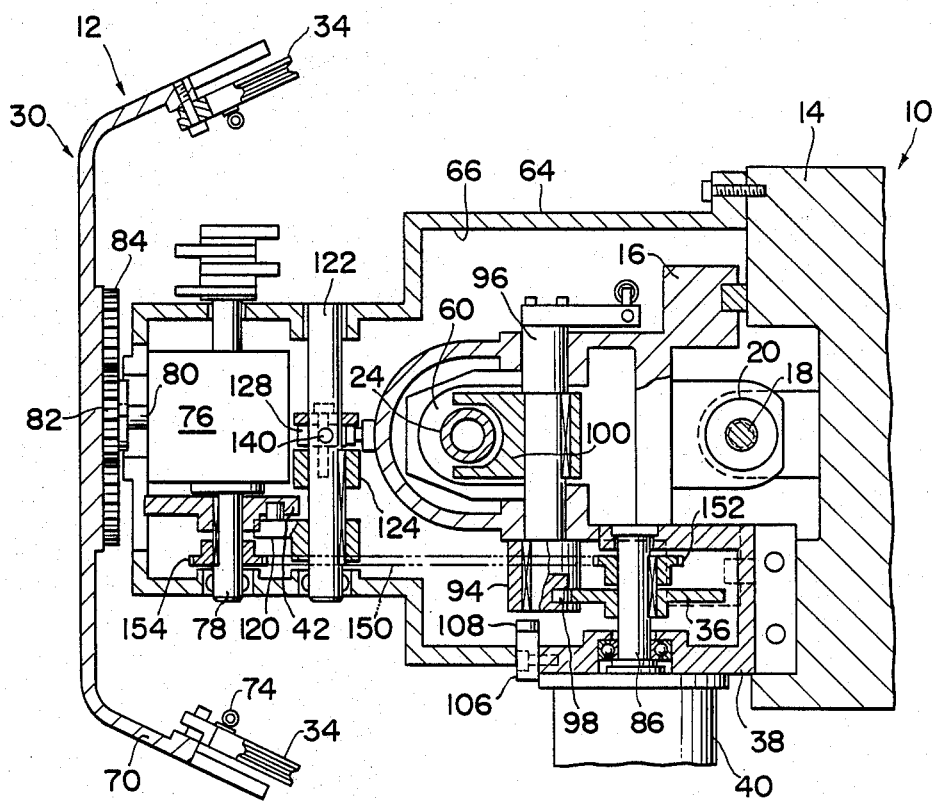
FIG. 2 is a horizontal section through the machine tool.

As shown also in FIGS. 1 and 2, a hollow spindle 24 is vertically mounted to the spindlehead 16 for rotation parallel to the axis of the worm 18. The spindle 24 travels up and down with the spindlehead 16 between a lower machining position (FIG. 7A) and an upper retracted position (FIG. 7E) past a tool change position (FIG. 7B) midway between the machining and retracted positions. FIG. 1 also depicts the spindle 24 in the tool change position. A second servomotor 26 is mounted atop the spindlehead 16 and drivingly coupled to the spindle 24 for imparting rotation thereto during machining. The servomotor 26 can arrest the rotation of the spindle 24 in a preassigned angular position. A chuck 28 of any known or suitable construction is built into the spindle 24 for rigidly but releasably holding a cutting tool on its bottom end.

The automatic tool changer 12 includes an indexing tool magazine 30 rotatable about an axis at an angle to the axis of the spindle 24. The tool magazine 30 carries a set of arbored cutting tools, two seen at 32 in FIG. 1, disposed at prescribed angular spacings about the tool magazine axis. The cutting tools 32 are mounted in such an attitude on the tool magazine 30 that each tool can be brought to a position of axial alignment with the spindle 24 as the magazine is indexed. A pair of gripper jaws 34 on the tool magazine 30 releasably grips each cutting tool 32 in position thereon. When actuated by means set forth hereafter, each pair of gripper jaws 34 spread apart to permit the associated cutting tool to be mounted to the spindle 24, or to accept the used cutting tool from the spindle.

Figure 3:
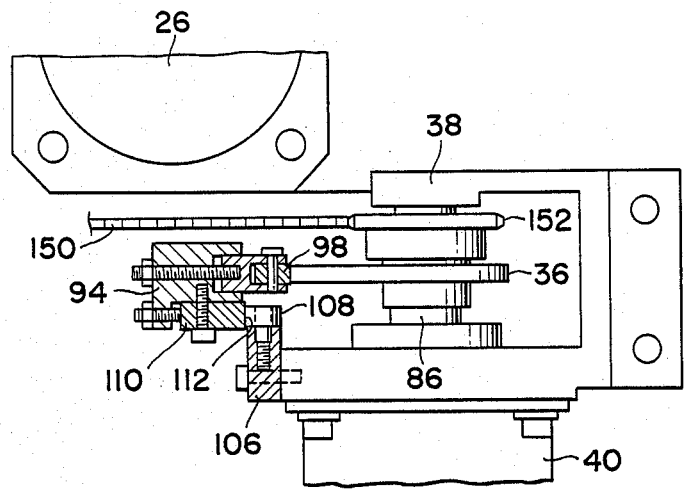
FIG. 3 is a fragmentary, enlarged plan view, with parts shown in section for clarity, of the machine tool, showing in particular the chuck control cam and associated cam follower means.
Figure 4:
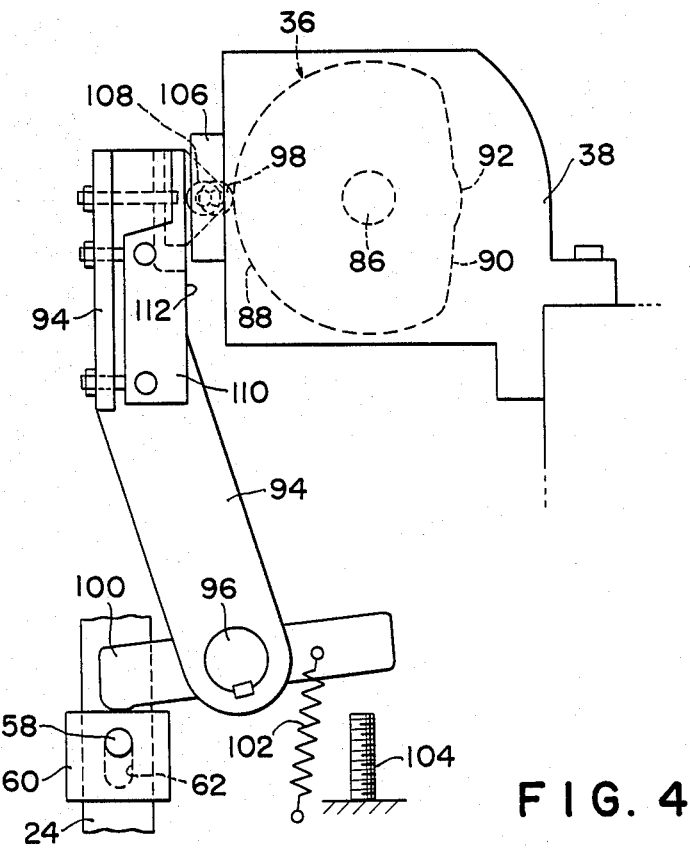
FIG. 4 is an elevation of the showings of FIG. 3.

Also included in the automatic tool changer 12 is a chuck control cam 36, shown also in FIGS. 3 and 4, mounted to a U shaped frame member 38 on the column 14 for rotation about a horizontal axis. Driven by a tool changer drive motor 40, the chuck control cam 36 acts, via associated cam follower means, to operate the spindle chuck 28 during the mounting and dismounting of the successive cutting tools 32 to and from the spindle 24.

Another important component of the automatic tool changer 12 is a gripper control cam 42 rotatable about an axis parallel to the axis of rotation of the chuck control cam 36. The gripper control cam 42 is provided with follower means acting on one of the pairs of gripper jaws 34 on the tool magazine 30 for spreading them apart during tool transfer between spindle 24 and tool magazine 30.

Not only the chuck control cam 36 but also the gripper control cam 42 and the tool magazine 30 are driven from the tool changer drive motor 40 via purely mechanical means in accordance with a feature of the invention.

The following is a more detailed discussion of the spindle 24 with its chuck 28, the tool magazine 30, the chuck control cam 36 with its follower means, the gripper control cam 42 with its follower means, and the tool changer drive motor 40 and associated drive means, under the separate headings. The operational description of the complete tool changer 12 will follow the detailed discussion of the listed components.

Spindle and Chuck Assembly

With reference to FIG. 1 the spindle 24 has a tapered tool hole 44 formed coaxially in its bottom end for receiving the arbor 46 of each cutting tool 32. The spindle chuck 28 includes a draw-in bar 48 received coaxially in the hollow of the spindle 24 with substantial clearance for up and down movement relative to the spindle. The draw-in bar 48 carries on its bottom end a pair of chucking jaws 50 for chucking engagement with a pull stud 52 extending upwardly or rearwardly from the taper shank of the arbor 46 of each cutting tool 32. Sleeved upon the draw-in bar 48, a disc spring assembly 54 biases the bar upwardly. Normally, therefore, the spindle chuck 28 is conditioned to firmly hold the cutting tool 32 with its jaws 50. The draw-in bar 48 has its top end embedded in a slidable member 56.

As will be seen also from FIG. 4, the slidable member 56 is rigidly joined via a pin 58 to a sleeve 60 slidably fitted over the spindle 24. The pin 58 slidably extends through a pair of slots 62 formed in diametrically opposed positions in the spindle 24 and extending parallel to the spindle axis. It will therefore be seen that the sleeve 60 is movable up and down with the draw-in bar 48 relative to the spindle 24. The sleeve 60 is to be depressed by the follower means of the chuck control cam 36 against the force of the disc spring assembly 54 for unchucking the tool from the spindle 24, as will be later described in more detail.

Tool Magazine

As shown in both FIGS. 1 and 2, the tool magazine 30 is rotatably mounted to a distal end of a support frame 64 which is proximally anchored to the column 14 and which defines a space 66 for accommodating the spindlehead 16 and other parts of the machine. The tool magazine 30 is generally in the shape of a disk formed in one piece with a central shaft 68 journaled to the support frame 64 for rotation about an axis slanting downwardly as it extends away from the spindlehead 16. The disklike tool magazine 30 has a flaring rim 70 whose lowermost part, as seen in FIG. 1, is contained in a plane right angularly crossing the spindle axis just under the spindle 24 when the latter is in the tool change position. The set of cutting tools 32 are releasably held by the respective pairs of gripper jaws 34 at predetermined tool stations on the flaring rim 70, such tool stations being disposed at constant angular spacings about the slanting axis of the tool magazine 30.

Figure 5:
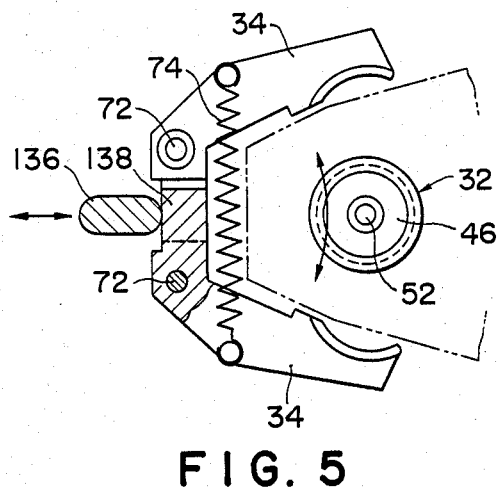
FIG. 5 is an enlarged plan view, with parts shown in section for clarity, of one of the pairs of gripper jaws relesably holding the cutting tools on the tool magazine shown in FIGS. 1 and 2, shown together with a push finger for opening the gripper jaws.

FIG. 5 best illustrates one of the pairs of gripper jaws 34 releasably holding the cutting tools 32 on the flaring rim 70 of the tool magazine 30, it being understood that the other pairs of gripper jaws are of like construction. Pivoted at 72 on the tool magazine rim 70, the representative pair of gripper jaws 34 are urged toward each other by a helical tension spring 74 for gripping the associated cutting tool 32 at its arbor 46. The pair of gripper jaws 34 are to be pivoted away from each other against the force of the tension spring 74 by the follower means of the gripper control cam 42 to be set forth subsequently, whereupon the cutting tool 32 will be released.

For imparting rotation to the tool magazine 30 there is employed an intermittent drive mechanism 76 coupled to a shaft 78 on which the gripper control cam 42 is fixedly mounted. Although the detailed construction of the intermittent drive mechanism 76 is not illustrated because of its conventional nature, it is understood that this mechanism comprises cams and rollers so arranged that its output shaft 80 rotates a unit indexing angle with each 180 degrees rotation of the gripper control cam shaft 78.

The output shaft of the intermittent drive mechanism 76 has a drive pinion 82 mounted fast thereon. The drive pinion 82 meshes with a driven gear 84 which is rigidly mounted on the tool magazine shaft 68. It is thus seen that the tool magazine 30 is mechanically driven directly from the gripper control cam shaft 78, which in turn is driven from the tool changer drive motor 40 via means that will become apparent as the description proceeds. The angle of each increment of rotation of the intermittent drive mechanism 76 and the speed reduction ratio of the drive pinion 82 and driven gear 84 depend upon the unit indexing angle of the tool magazine 30, that is, upon the number of tool stations on the tool magazine.

Chuck Control Cam and Follower Means

The chuck control cam 36 and the associated cam follower means are shown in FIGS. 1 and 2 and on an enlarged scale in FIGS. 3 and 4. The chuck control cam 36 is fixedly mounted on a camshaft 86 which is rotatably and horizontally mounted to the frame member 38 and which is coupled directly to the tool changer drive motor 40. As indicated in FIG. 4, the chuck control cam 36 is peripherally contoured to provide a larger diameter portion 88 and a reduced diameter portion 90, with a relatively small protuberance 92 formed in the middle of the reduced diameter portion 90.

At 94 is seen a chuck control cam follower lever which is proximally mounted fast on a rotatable shaft 96 which in turn is mounted horizontally to the spindlehead 16. The cam follower lever 94 rotatably carries a roll 98 on its distal end for rolling engagement with the contoured periphery of the chuck control cam 36. Thus the shaft 96 rotates as the chuck control cam 36 rotates in rolling contact with the roll 98 on the cam follower lever 94.

Medially mounted fast on the shaft 96, an unchucking arm 100 has a bifurcated end, best seen in FIG. 2, overlying the slide sleeve 56 on the spindle 24. The cam follower lever 94 will turn in a counterclockwise direction, as viewed in FIG. 1, as the roll 98 thereon rides on the larger diameter portion 88 of the chuck control cam 36 as in FIG. 4. Thereupon, with the rotation of the shaft 96 in the same direction, the unchucking arm 100 thereon will depress the slide sleeve 56 thereby opening the chuck 28. As shown in both FIGS. 1 and 4, a helical tension spring 102 extends between the other end of the unchucking arm 100 and the spindlehead 16 for urging the cam follower lever 94 into rolling engagement with the chuck control cam 36. A limit stop 104 on the spindlehead 16 is engageable with the unchucking arm 100 for limiting the pivotal motion of the cam follower lever 94 under the force of the tension spring 102 when the roll 98 thereon comes to ride on the protuberance 92 of the chuck control cam 36.

As clearly revealed by both FIGS. 3 and 4, another limit stop 106 is rigidly fastened to the frame member 38. The limit stop 106 has mounted thereto a roll 108 rotatable about an axis parallel to that of the shaft 96. Engageable with this stop roll 108 is a contact member 110 which is secured to the free end of the cam follower lever 94 and which has an approximately vertically elongated contact surface 112 for direct contact with the stop roll 108. The limit stop 106 with the roll 108 coacts with the contact member 110 for holding the cam follower lever 94 in the angular position of FIG. 4 with respect to the chuck control cam 36 when the spindlehead 16 with the spindle 24 and cam follower lever 94 thereon is located above the tool change position of FIG. 1

Gripper Control Cam and Follower Means

Figure 6:
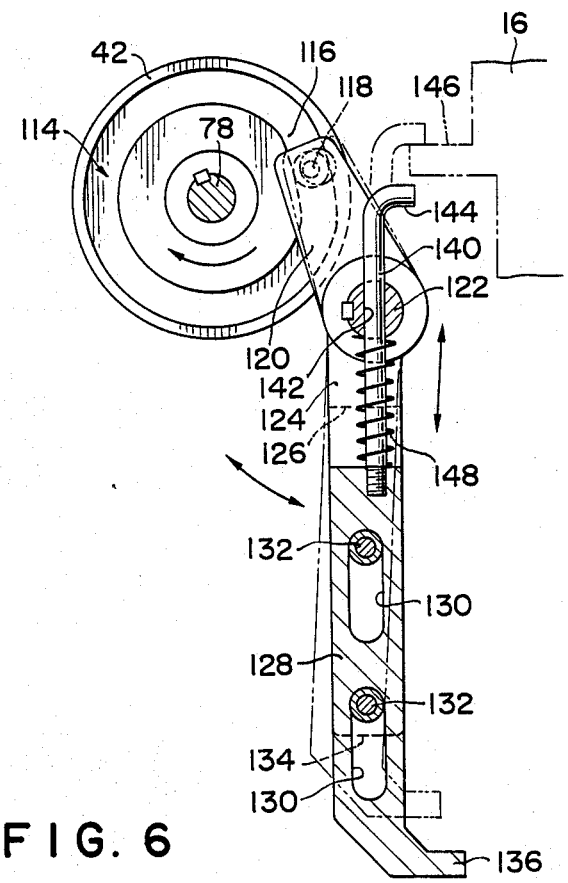
FIG. 6 is an enlarged elevation, with parts shown in section for clarity, of the gripper control cam and associated cam follower means of the machine tool.

Although FIGS. 1 and 2 both show the gripper control cam 42 and the associated cam follower means, FIG. 6 better illustrates that the gripper control cam 42 is generally in the shape of a disc keyed to the noted shaft 78 and having a substantially annular cam groove 114 formed in one of its opposite faces. The cam groove 114 has a reduced diameter portion 116. Rollably engaged in the cam groove 114 is a roll 118 on one end of a cam follower lever 120 which is secured at the other end to a shaft 122. This shaft 122 is mounted to the support frame 64 for rotation about an axis parallel to that of the gripper control cam shaft 78.

An inspection of both FIGS. 2 and 6 will reveal that a carrier arm 124 is also rigidly mounted on the shaft 122 and extends downwardly therefrom for joint angular displacement with the cam follower lever 120. The carrier arm 124 is bifurcated at 126, FIG. 6, and slidably carries between its two constituent parts a tool release arm 128 in collinear relation thereto. The tool release arm 128 has formed therein a pair of guide slots 130 spaced from each other, and each extending, in its longitudinal direction. Each guide slot 130 slidably receives a guide pin 132 having its opposite ends rigidly anchored to the two parts of the bifurcated carrier arm 124. Thus the tool release arm 128 is constrained to linear displacement relative to the carrier arm 124 in its longitudinal direction but is pivotable with the carrier arm about the shaft 122 as the cam follower lever 122 is pivoted by the gripper control cam 42. Extending downwardly beyond the lower extremity 134 of the carrier arm 124, the tool release arm 128 terminates in a push finger 136 bent approximately right angularly therefrom toward the spindle 24.

As best seen in FIG. 5, the push finger 136 is held opposite the overlapping extensions 138 of that pair of gripper jaws 34 on the tool magazine 30 which has been indexed to the tool change position of the spindle 24. When the roller 118 on the cam follower lever 120 rides in the reduced diameter portion 116 of the gripper control cam groove 114, the push finger 136 will be thrust against the gripper jaw extensions 138 thereby spreading the pair of gripper jaws 34 against the force of the tension spring 74 with the consequent release of the cutting tool 32.

With reference back to FIG. 6 in particular a generally upstanding draw bar or stud 140 slidably extends through a hole 142 formed diametrally in the shaft 122. The bottom end of the draw bar 140 is firmly embedded in the tool release arm 128 whereas its top end is bent toward the spindlehead 16 to provide a hook 144. Engageable with the hook 144 is a ledge 146 formed on the spindlehead 16 by fastening an L shaped member thereto as better shown in FIG. 1. A helical compression spring 148 extends between the shaft 122 and the top end of the tool release arm 128.

Normally, as indicated by the solid lines in FIG. 6, the compression spring 148 holds the tool release arm 128 lowered with respect to the bifurcated carrier arm 124. Upon upward travel of the spindlehead 16 the ledge 146 thereon will engage the hook 144 of the draw bar 140 and pull the tool release arm 128 upwardly against the force of the compression spring 148 in order to avoid interference of the push finger 136 with the tool magazine 30.

Tool Changer Drive Means

As has been stated, the various moving parts of the automatic tool changer 12 are all driven from the tool changer drive motor 40 seen in FIGS. 2 and 3. The tool changer drive motor 40 directly drives the chuck control cam 36 via the shaft 86. The rotation of the shaft 86 is further imparted to the gripper control cam 42 via a positive drive linkage which in this embodiment is shown as a chain drive. As shown also in FIG. 1, an endless chain 150 extends between a drive sprocket 152 on the chuck control cam shaft 86 and a driven sprocket 154 on the gripper control cam shaft 78. The two sprockets 152 and 154 are of the same diameter, so that the chuck control cam 36 and gripper control cam 42 are driven at the same rate.

The gripper control cam shaft 78 is drivingly coupled to the shaft 68 of the indexing tool magazine 30 via the mechanical intermittent drive assembly 76 and gears 82 and 84, as has been set forth in conjunction with the tool magazine.

Operation

Figure 7A:
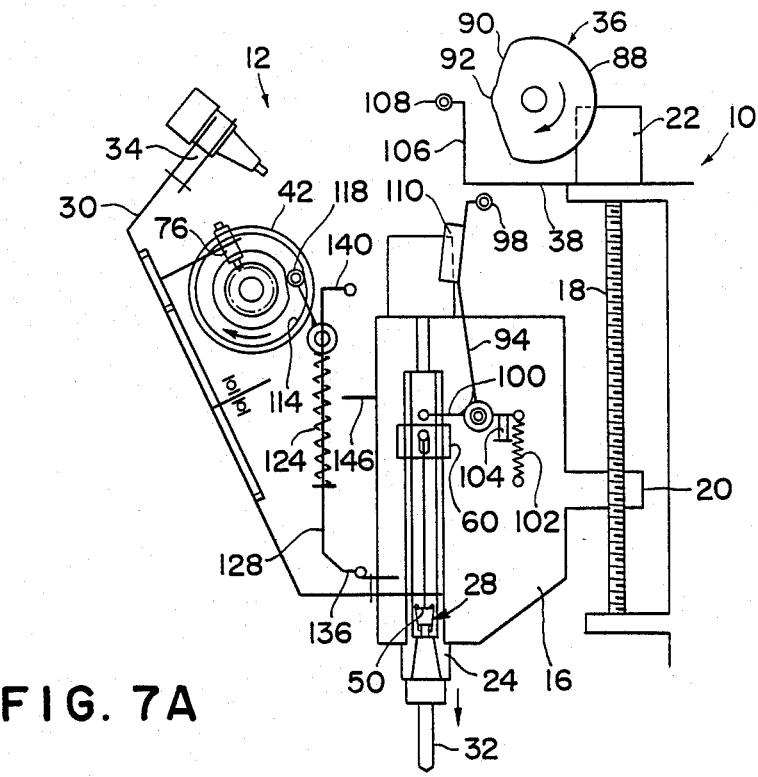
FIGS. 7A-7H is a series of diagrammatic representations of the machine tool, each somewhat similar to FIG. 1, showing a sequence of steps in one complete cycle of tool changing operation by the automatic tool changer.

One cycle of tool changing operation by the automatic tool changer 12 will become apparent from a study of FIGS. 1 and 7A–7H which sequentially illustrate the steps of such cycle. Reference may also be had to FIG. 8 which diagrammatically summarizes the operation of the automatic tool changer 12, indicating the angular positions of the chuck control cam 36, gripper control cam 42 and the tool magazine 30.

FIG. 1 represents the machine tool 10 in a state such that a first of the series of cutting tools 32 on the tool magazine 30 has just been chucked onto the spindle 24 in the tool change position. The tool changer drive motor 40 is out of rotation, with the chuck control cam 36 in such an angular position that the roll 98 on the cam follower lever 94 rides on the small protuberance 92 in the middle of the reduced diameter portion 90 of the chuck control cam 36. The unchucking arm 100 is pivoted away from the slide sleeve 60 on the spindle 24 under the bias of the tension spring 102, thereby permitting the chuck jaws 50 to engage the first cutting tool 32 under the force of the disc spring assembly 54. The gripper control cam 42 is in such an angular position that the roll 118 on the cam follower lever 120 is in the reduced diameter portion 116 of the cam groove 114. Consequently, the tool release arm 128 is pivoted counterclockwise with the carrier arm 124, as indicated by the solid lines in FIG. 6, with the result that the pair of gripper jaws 34 being held in the tool change position are opened by the push finger 136 against the force of the tension spring 74. Thus the first cutting tool 32 has been chucked onto the spindle 24 and released by the associated pair of gripper jaws 34.

FIG. 8 indicates these start positions of the chuck control cam 36 and gripper control cam 42 at A.

The machine tool being now ready for machining with the first cutting tool, the servomotor 22 may be set into rotation in a required direction for lowering the spindle 24 to the machining position. FIG. 7A shows the spindle 24 thus lowered to the machining position. It will be seen that the chuck control cam 36 and the gripper control cam 42 are left standing by in the same angular positions as in FIG. 1 during the subsequent progress of machining. The servomotor 26 on the spindlehead 16 is energized to impart rotation to the sindle 24 during such machining.

Upon completion of machining with the first cutting tool the servomotor 22 may be set into rotation in the reverse direction for lifting the spindle 24 back to the tool change position of FIG. 1 with the spindlehead 16. Since the chuck control cam 36 has been at a standstill, the roll 98 on the cam follower lever 94 will ride back on the small protuberance 92 of the cam 36 as the spindle 24 returns to the tool change position.

Figure 7B:
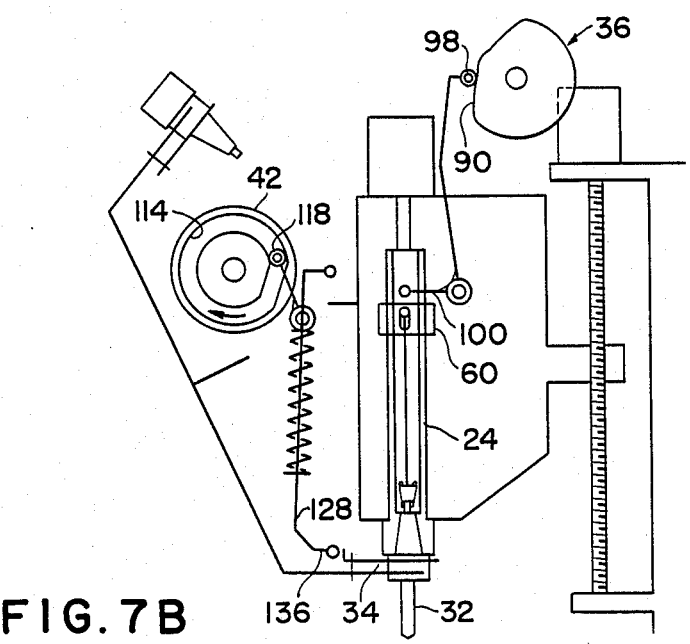
Figure 8:
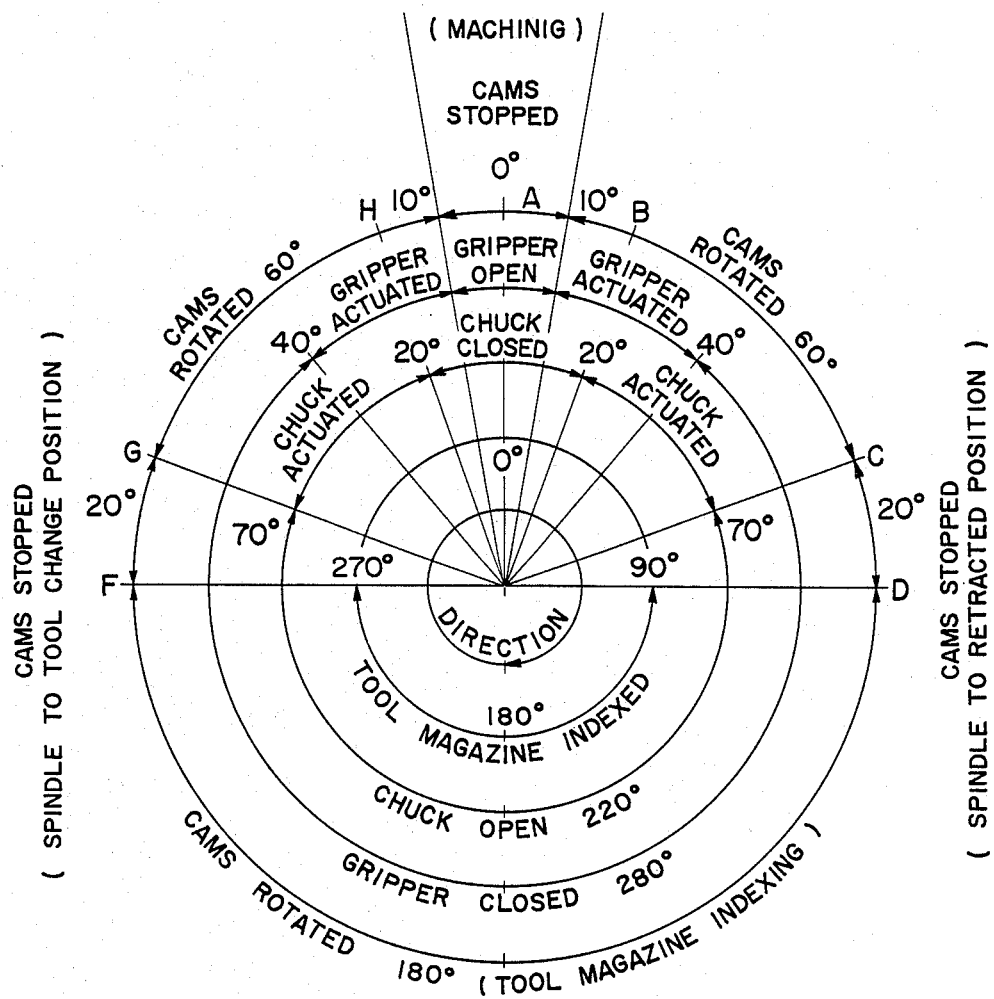
FIG. 8 is a timing chart summarizing the tool changing steps of FIG. 7A-7H in relation to one complete revolution of the chuck control cam and the gripper control cam.

In FIG. 7B are shown the chuck control cam 36 and gripper control cam 42 subsequently revolved approximately 20 degrees in a clockwise direction from its FIGS. 1 and 7A position to the position B in FIG. 8. The cam follower roll 98 is still on the reduced diameter portion 90 of the chuck control cam 36. Accordingly, the unchucking arm 100 remains out of contact with the slide sleeve 60 on the spindle 24, holding the first cutting tool 32 chucked to the spindle. However, the angular position of the gripper control cam 42 is such that the cam follower roll 118 has already ridden onto the larger diameter portion of the cam groove 114. With the consequent clockwise turn of the tool release arm 128 with the carrier arm 124, the push finger 136 has moved out of contact with the extensions 138 of the pair of gripper jaws 34, permitting the latter to pivot toward each other under the force of the tension spring 74 and hence to grip the first cutting tool 32 therebetween.

Figure 7C:
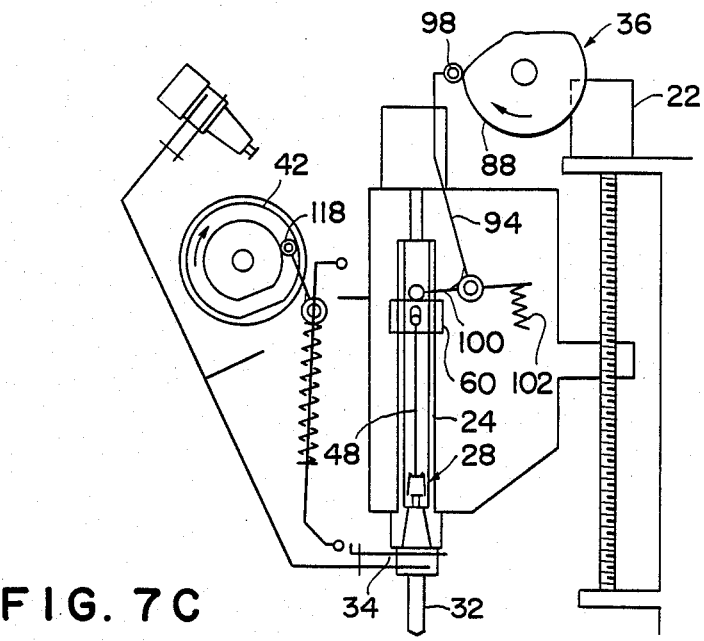

FIG. 7C shows the chuck control cam 36 subsequently revolved to the position C in FIG. 8, in which the cam follower roll 98 start riding on the larger diameter portion 88 of the chuck control cam. As the cam follower lever 94 is thus turned counterclockwise against the effect of the tension spring 102, the bifurcated unchucking arm 100 will engage and depress the slide sleeve 60 with respect to the spindle 24 against the force of the disc spring assembly 54. With the simultaneous downward displacement of the draw-in bar 48, the spindle chuck 28 will open to disengage the first cutting tool 32. The pair of gripper jaws 34 in the tool change position will remain gripping the first cutting tool 32 as the cam follower roll 118 still lies in the larger diameter portion of the gripper control cam 42.

Figure 7D:
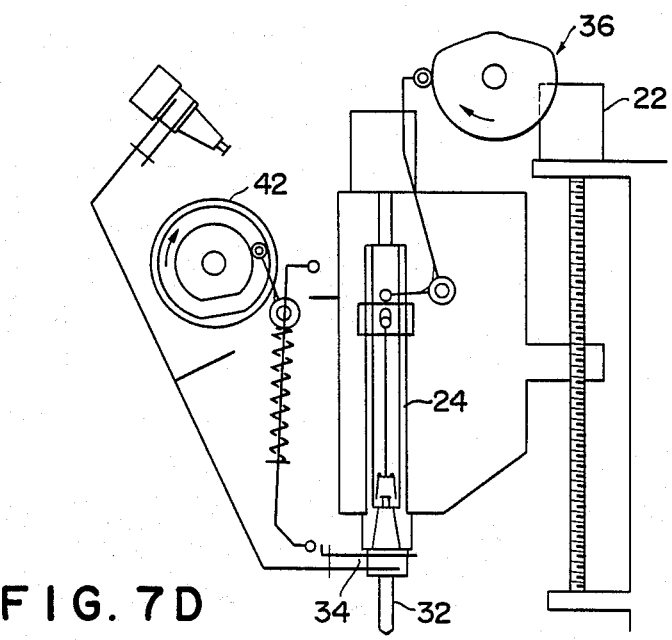

The tool changer drive motor 40 is temporarily set out of rotation after the cams 36 and 42 are subsequently revolved approximately 20 degrees to the position D in FIG. 8. FIG. 7D represents this state. The first cutting tool 32 remains unchucked from the spindle 24 and gripped by the pair of gripper jaws 34.

Figure 7E:
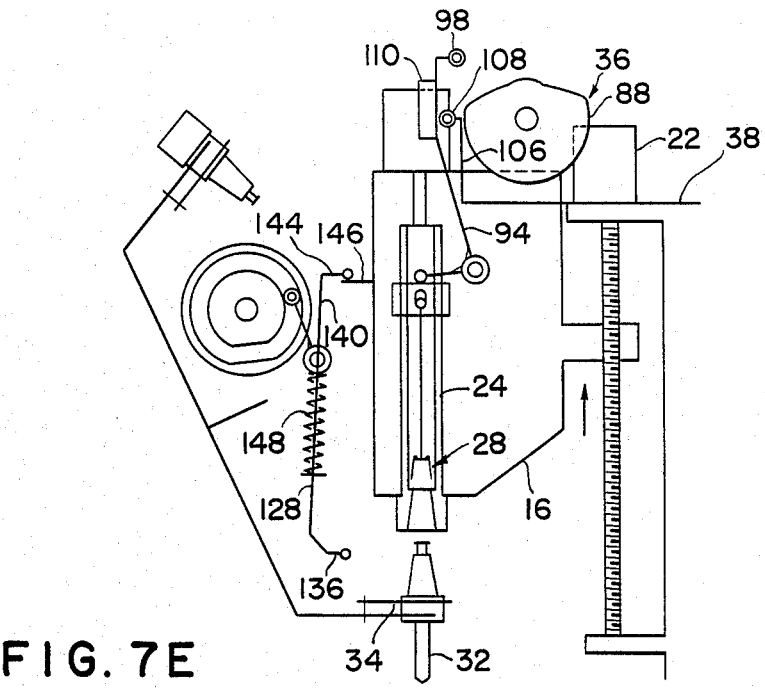

Then, with the tool changer drive motor 40 held out of rotation, the servomotor 22 is again set into rotation in the reverse direction for raising the spindle 24 to the retracted position of FIG. 7E. This retracted position is so determined in relation to the tool change position that the unchucked cutting tool 32 is thoroughly withdrawn from the spindle 24 when the latter reaches the retracted position.

During the ascent of the spindle 24 from the tool change position of FIG. 7D to the retracted position of FIG. 7E, the ledge 146 on the spindlehead 16 will engage the hook 144 of the draw bar 140 anchored to the tool release arm 128. The draw bar 140 will then draw the tool release arm 128 to the phantom position of FIG. 6 against the force of the tension spring 148. Such retraction of the tool release arm 128 with its push finger 136 is needed to avoid its interference with the gripper jaws 34 during the subsequent indexing of the tool magazine 30.

It will also be noted from FIG. 7E that the contact member 110 on the chuck control cam follower lever 94 comes into rolling engagement with the limit stop 106 on the frame member 38 via the roll 108 when the spindle 24 is in the retracted position. Therefore, even though the roll 98 on the cam follower lever 94 has ridden off the chuck control cam 36, the lever 94 will remain in the same angular position as when the roll 98 is on the larger diameter portion 88 of the cam 36. The spindle chuck 28 will thus be held open when the spindle 24 is in the retracted position.

Figure 7F:
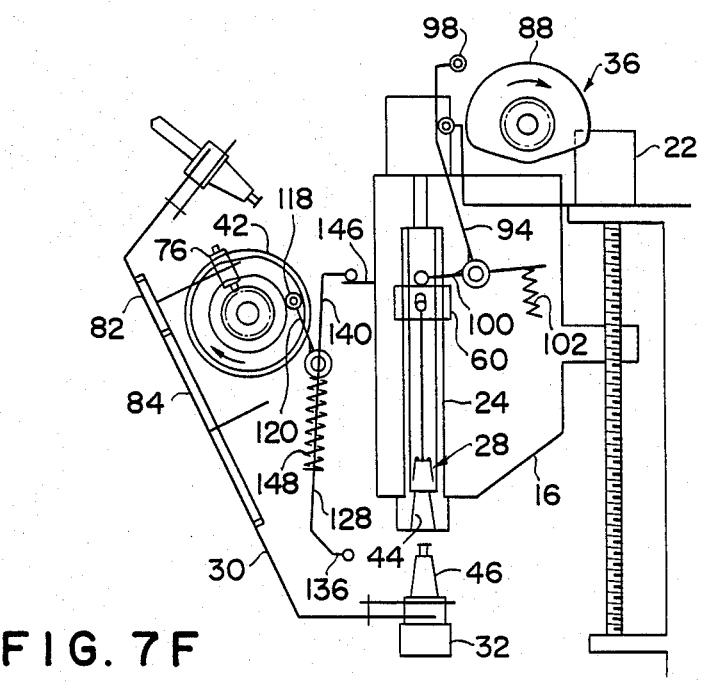

Then, with the spindle 24 held retracted, the tool changer drive motor 40 may again be set into rotation for jointly revolving the chuck control cam 36 and gripper control cam 42 through an angle of 180 degrees from the position D to the position F in FIG. 8. FIG. 7F shows the resulting state of the machine. Attention should be paid not only to the angular positions of the cams 36 and 42 but also to that of the tool magazine 30. Driven from the gripper control cam shaft 78 via the intermittent drive mechanism 76 and the gears 82 and 84, the tool magazine 30 has been indexed through an angle required for brining the second desired cutting tool 32 to the position of axial alignment with the spindle 24 being held in the retracted position. The tool changer drive motor 40 comes to another stop after the 180 degrees rotation.

Then the servomotor 22 is again energized for lowering the spindle 24 from the retracted to the tool change position, with the cams 36 and 42 and tool magazine 30 maintained in the positions of FIG. 7F. The spindle 24 when lowered to the tool change position will receive the arbor 46 of the second cutting tool 32 in its tapered tool hole 44. Also, as the spindlehead 16 is lowered with the spindle 24, the roll 98 on the cam follower lever 94 on the spindlehead will reengage the chuck control cam 36 at its larger diameter portion 88. The unchucking arm 100 will therefore be still acting on the slide sleeve 60 on the spindle 24 against the force of the tension spring 102, holding the spindle chuck 28 open.

Further, with the above descent of the spindle 24 from the retracted to the tool change position, the draw bar 140 will be disengaged from the ledge 146 on the spindlehead 16, permitting the tool release arm 128 to be lowered to its working position with respect to the bifurcated carrier arm 124 under the force of the compression spring 148. However, the roll 118 on the cam follower lever 120 is still on the larger diameter portion of the gripper control cam 42. Since the push finger 136 of the tool release arm 128 will thus be held away from the gripper jaw extensions 138, the second cutting tool 32 will remain gripped on the tool magazine 30 even though it has had its arbor 46 received as aforesaid in the tool hole 44 of the spindle 24.

Figure 7G:
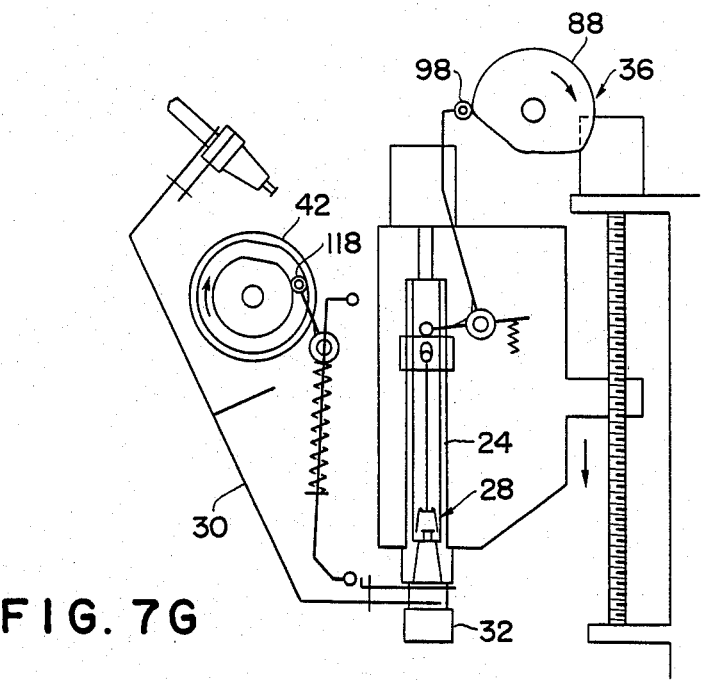
Figure 7H:
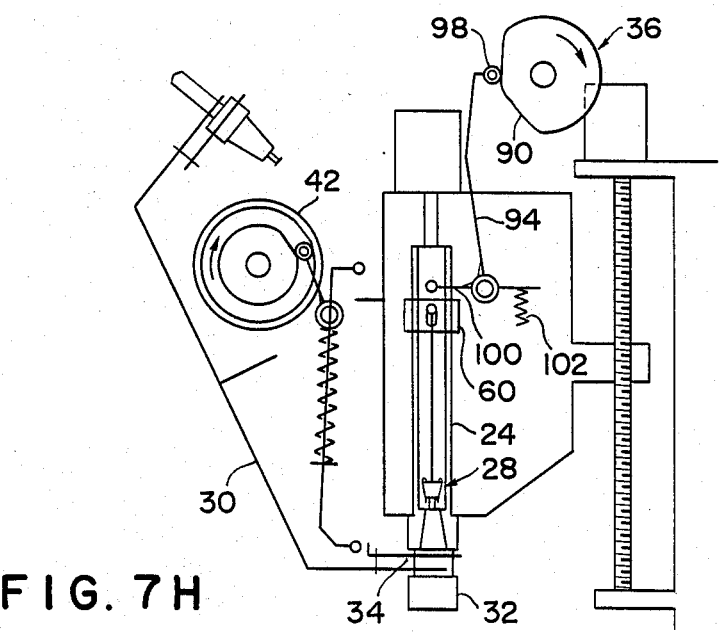

Then the tool changer drive motor 40 may be reenergized for revolving the cams 36 and 42 approximately 20 degrees from the position F to position G in FIG. 8. FIG. 7G shows the resulting state. It will be observed that the cam follower roll 98 is still on the larger diameter portion 88 of the chuck control cam 36, holding the spindle chuck 28 open. The gripper control cam 42 is still in such an angular position that the second cutting tool 32 will remain gripped on the tool magazine 30.

Then, with the continued energization of the tool changer drive motor 40, the cams 36 and 42 are revolved from the position G to position H in FIG. 8. Now, as will be noted from FIG. 7H, the cam follower roll 98 has ridden back onto the reduced diameter portion 90 of the chuck control cam 36. The cam follower lever 54 will then turn clockwise under the bias of the tension spring 102. Upon consequent disengagement of the unchucking arm 100 from the slide sleeve 60 on the spindle 24, the spindle chuck 28 will firmly engage the second cutting tool 32 under the force of the disc spring assembly 54. The gripper control cam 42, on the other hand, is still in such an angular position that the second cutting tool 32 will remain gripped on the tool magazine 30.

Then, with the further continued energization of the tool changer drive motor 40, the cams 36 and 42 are revolved from the position H back to the initial position A in FIG. 8. The machine tool 10 has now returned to the state of FIG. 1. The tool changer drive motor 40 may be set out of rotation. As will be seen by referring back to FIG. 1, the cam follower roll 118 rides on the reduced diameter portion 116 of the gripper control cam 114, with the result that the push finger 136 of the tool release arm 128 pushes the extensions 138 of the gripper jaw pair 34 in the tool change position thereby causing the same to release the second cutting tool 32.

The machine tool 10 is now ready for the commencement of machining with the second cutting tool. The spindle 32 with the second cutting tool chucked thereto may be depressed to the machining position, as in FIG. 7A, for the next cycle of operation.

While there has been disclosed what is presently believed to be a preferable embodiment of the invention, it will be understood that various modifications may be made in such disclosure to conform to design preferences or to the requirements of specific applications of the invention. The appended claims are intended to cover all such modifications as fall within the true spirit and scope of the invention.

What is claimed is:

1. In a machine tool for use with a plurality of different cutting tools, in combination:
   (a) frame means;
   (b) a spindlehead mounted to the frame means for linear reciprocating movement relative to the same in a predefined direction;
   (c) a spindle mounted to the spindlehead for rotation relative to the same about a first axis extending in the predefined direction of movement of the spindlehead and having a tool hole defined coaxially in one end thereof, the spindle traveling with the spindlehead between a machining position and a retracted position past a tool change position;
   (d) an indexing tool magazine mounted to the frame means for rotation relative to the same about a second axis at an angle to the first axis, the tool magazine carrying a set of cutting tools at prescribed angular spacings about the second axis and in such an attitude that, with the rotation of the tool magazine, each cutting tool can be brought to a position of axial alignment with the spindle for engagement in the tool hole therein with the travel of the spindle from the retracted to the tool change position;
   (e) chuck means built into the spindle for releasably holding the cutting tool engaged in the tool hole;
   (f) a chuck control cam rotatably mounted to the frame means;
   (g) chuck control cam follower means acted upon by the chuck control cam and acting on the chuck means for causing the same to chuck and unchuck the successive cutting tools on the tool magazine in the tool change position;
   (h) gripper means on the tool magazine for releasably gripping each cutting tool thereon;
   (i) a gripper control cam rotatably mounted to the frame means;
   (j) gripper control cam follower means acted upon by the gripper control cam and acting on the gripper means for causing the same to release each new cutting tool that has been chucked onto the spindle in the tool change position, and to grip the used cutting tool that has been returned with the spindle from the machining position to the tool change position;
   (k) a rotary actuator for imparting rotation to either one of the chuck control cam and the gripper control cam;
   (l) a mechanical drive linkage for transmitting rotation from said one to the other of the chuck control cam and the gripper control cam; and
   (m) mechanical intermittent drive means driven from the rotary actuator and coupled to the tool magazine for indexing the same in relation to the joint rotation of the chuck control cam and the gripper control cam;
   (n) whereby the chuck control cam, the gripper control cam and the tool magazine are all driven mechanically from the single rotary actuator in precise synchronism with one another.

2. The machine tool of claim 1 wherein the rotary actuator is coupled to the chuck control cam for directly driving the same, and wherein the gripper control cam is driven from the chuck control cam via the mechanical drive linkage.

3. The machine tool of claim 2 wherein the intermittent drive means is connected between the gripper control cam and the indexing tool magazine.

4. The machine tool of claim 1 wherein the chuck control cam follower means comprises:
   (a) a cam follower lever pivotally mounted to the spindlehead and operatively engaged with the chuck control cam when the spindle is in the tool change position; and
   (b) resilient means on the spindlehead for biasing the cam follower lever into operative engagement with the chuck control cam;
   (c) the cam follower lever being pivoted with the rotation of the chuck control cam between a chucking position for causing the chuck means to engage one of the cutting tools and an unchucking position for causing the chuck means to release the cutting tool.

5. The machine tool of claim 4 wherein the chuck control cam follower means further comprises a limit stop mounted to the frame means and engageable with the cam follower lever upon displacement of the spindle from the tool change position toward the retracted position in order to maintain the cam follower lever in the unchucking position while the cam follower lever is out of engagement with the chuck control cam.

6. The machine tool of claim 4 wherein the chuck control cam follower means further comprises:
   (a) a slide sleeve coupled to the chuck means and fitted over the spindle for axial displacement relative to the same; and
   (b) an unchucking arm pivotable jointly with the cam follower lever for movement into and out of engagement with the slide sleeve, the unchucking arm acting on the slide sleeve for opening the chuck upon pivotal movement of the cam follower lever from the chucking to the unchucking position.

7. The machine tool of claim 1 wherein the gripper control cam follower means comprises:
   (a) a cam follower lever pivotally mounted to the frame means and operatively engaged with the gripper control cam in order to be pivoted thereby; and
   (b) arm means mounted to the frame means for joint pivotal motion with the cam follower lever into and out of engagement with the gripper means.

8. The machine tool of claim 7 wherein the arm means of the gripper control cam follower means comprises:
   (a) a carrier arm rigidly coupled to the cam follower lever for joint pivotal motion therewith;
   (b) a tool release arm mounted to the carrier arm for joint pivotal motion therewith while being displaceable relative to the carrier arm between a working position and a non-working position, the tool release arm when in the working position being pivotable with the carrier arm into and out of engagement with the gripper means;

(c) resilient means for holding the tool release arm in the working position with respect to the carrier arm at least when the spindle is in the tool change position; and (d) means for moving the tool release arm from the working to the nonworking position against the force of the resilient means upon movement of the spindle from the tool change position to the retracted position in order to avoid interference of the tool release arm with the gripper means during the indexing of the tool magazine.

9. The machine tool of claim 8 wherein the tool release arm is mounted collinearly to the carrier arm and constrained to longitudinal displacement relative to the latter between the working and nonworking positions, and wherein the means for moving the tool release arm comprises:

(a) a draw bar anchored at one end to the tool release arm; and (b) engagement means on the spindlehead engageable, upon movement of the spindle from the tool change position toward the retracted position, with another end of the draw bar for moving the tool release arm from the working to the nonworking position against the force of the resilient means.

* * * * *